(No Model.)
E. HOMAN.
BICYCLE.
No. 529,267. Patented Nov. 13, 1894.
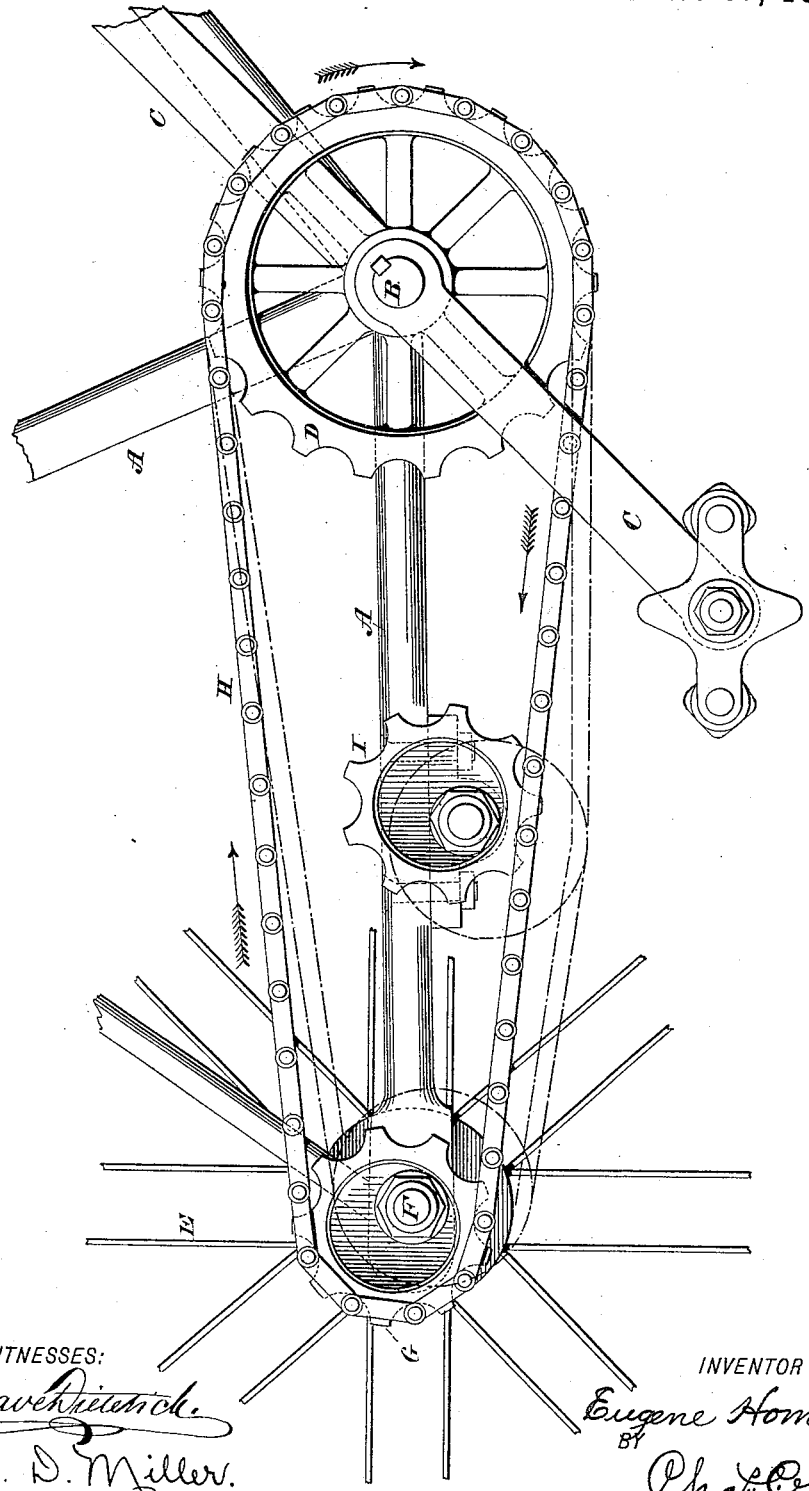
WITNESSES:
Gustave Dietrich
Ed. D. Miller
INVENTOR
Eugene Homan,
BY
Chas. C. Gill
ATTORNEY.

UNITED STATES PATENT OFFICE.

EUGENE HOMAN, OF NEW YORK, N. Y.

BICYCLE.

SPECIFICATION forming part of Letters Patent No. 529,267, dated November 13, 1894.

Application filed April 15, 1893. Serial No. 470,447. (No model.)

*To all whom it may concern:*

Be in known that I, EUGENE HOMAN, a citizen of the United States, and a resident of New York, in the county of New York and State of New York, have invented certain new and useful Improvements in Bicycles, of which the following is a specification.

The invention relates to improvements in bicycles, and pertains more particularly to what is popularly known as the "safety," in which the pedal shaft and rear axle carry sprocket wheels connected by an endless chain.

The object of the invention is to afford means for increasing the power and speed of the bicycle and to this end I provide on the rear axle an eccentric sprocket wheel containing one-half the number of teeth possessed by the larger sprocket wheel on the pedal shaft, and this eccentric wheel is so arranged that its greater radius ascends to its most effective point just as power is to be applied by the rider to the pedals. The eccentric sprocket wheel will make two revolutions to each revolution of the pedal-shaft sprocket wheel, and its relation to the pedals is such that its greatest radius moves in time therewith, whereby as each pedal comes to position to receive power from the rider the greatest radius of said wheel will reach the point at which it can impart the maximum and most effective force directly to the rear axle of the bicycle.

In order to prevent the lower side of the chain from being slack while the shorter radius of the eccentric wheel is in rear of the axle, I provide an intermediate eccentric sprocket wheel equal in size to the wheel on the rear axle and arranged simply to take up the slack in the chain. This intermediate eccentric sprocket wheel will revolve freely on its axis and will preferably be located between the two longitudinal sides of the chain.

The invention will be more fully understood from the detailed description hereinafter presented, reference being had to the accompanying drawing, in which is represented in side elevation a portion of the bicycle provided with the features constituting the present invention.

In the drawing A designates the frame of the bicycle; B, the pedal-shaft; C, the pedal cranks; D, the sprocket wheel on the pedal-shaft; E, the rear wheel of the bicycle; F, the rear axle; G, the eccentric sprocket wheel on the rear axle; H, the endless chain on said sprocket wheels, and I the intermediate eccentric sprocket wheel which serves to keep the chain taut.

The invention resides more particularly in the sprocket wheels D, G, I, and chain H, and in carrying the same into effect the wheel G is given the form of an eccentric and secured on the rear axle F, and the wheel D is secured on the pedal shaft B and connected by the drive chain H with said eccentric wheel G. The wheel D is twice the size of the wheel G, and makes but one revolution to two of the latter. The wheel G is secured on the rear axle F in an important relation to the pedal cranks C, and this relation is such that during the movement of the parts the greatest radius of the wheel will ascend to its most effective working point just as each pedal crank reaches its position to receive the power from the foot of the rider and hence the propelling force on the rear axle is increased and the speed accelerated.

With the depression of each pedal, the longer radius of the wheel G moves downward with the motion of the rear wheel E and the shorter radius of the wheel G passes in rear of the axle F, thus allowing the lower longitudinal half of the chain H to slacken, as indicated by dotted lines. This slackening of the chain would not prevent the due operation of the propelling mechanism but it is preferred to keep the chain taut and to this end there is provided the intermediate eccentric sprocket wheel I, which engages the chain and causes its longer radius to move against the same at the time that the wheel G allows the chain to slacken, as denoted by dotted lines, thus filling out the chain and preventing the lower side of same from loosely hanging downward. When the longer radius of the wheel G passes upward around the rear of the axle F, thereby itself filling out the chain H, the wheel I will move its longer radius correspondingly upward to release the chain. Thus the wheels G, I, operate in unison and the chain is kept taut at all times.

The operation of the invention will be understood from the foregoing description and is indicated in the accompanying drawing. The movement of the pedal-cranks and their shaft remains unchanged, but since the eccentric wheel on the rear axle makes two revolutions to one of the wheel on the pedal-shaft and moves with relation to said cranks, the efficiency of propelling force is increased and a higher rate of speed rendered attainable.

It will be observed that in accordance with my invention I am enabled to accurately obtain the full benefit of the longest radius of the wheel G for each pedal crank, without increasing the weight or otherwise impairing the machine.

What I claim as my invention, and desire to secure by Letters Patent, is—

1. In a bicycle or analogous vehicle the eccentric sprocket wheel on the rear axle, and the sprocket wheel on the pedal-shaft, combined with the pedal-cranks and the chain connecting said sprocket wheels, the said eccentric sprocket wheel being one-half the size of the pedal-shaft sprocket wheel and arranged with respect to said cranks, so that the longer axis of the eccentric comes to its working position as each pedal reaches its initial position to receive power, substantially as and for the purposes set forth.

2. In a bicycle or analogous vehicle the eccentric sprocket wheel on the rear axle, and the sprocket wheel on the pedal-shaft, the latter sprocket wheel being double the size of the eccentric sprocket wheel, combined with the pedal-cranks, the chain connecting said sprocket wheels, and the intermediate eccentric sprocket wheel engaging said chain; substantially as and for the purposes set forth.

3. In a bicycle or other like vehicle, the combination with the driving chain, an eccentric sprocket wheel on either the pedal shaft or the rear axle and a sprocket wheel upon the other, of an eccentrically arranged sprocket wheel connected with the frame of the vehicle and its sprockets meshing with the links of the driving chain; substantially as set forth.

Signed at New York, in the county of New York and State of New York, this 12th day April, A. D. 1893.

EUGENE HOMAN.

Witnesses:
CHAS. C. GILL,
ED. D. MILLER.